United States Patent [19]

Beissbarth

[11] 4,341,021
[45] Jul. 27, 1982

[54] WHEEL ALIGNMENT MEASURING APPARATUS

[76] Inventor: Osmond Beissbarth, Sulzbacher Str. 15, 8000 Munich 40, Fed. Rep. of Germany

[21] Appl. No.: 180,240

[22] Filed: Aug. 22, 1980

[30] Foreign Application Priority Data

Aug. 24, 1979 [DE]  Fed. Rep. of Germany ....... 2934411
Jun. 12, 1980 [DE]  Fed. Rep. of Germany ....... 3022071

[51] Int. Cl.³ ............................................. G01B 5/255
[52] U.S. Cl. .................................... 33/203.18; 33/288
[58] Field of Search ................ 33/203, 203.18, 203.19, 33/203.20, 288, 336, 337; 356/152, 155

[56] References Cited

U.S. PATENT DOCUMENTS

| | | | |
|---|---|---|---|
| 3,164,910 | 1/1965 | Manlove | 33/203.18 |
| 4,106,208 | 8/1978 | Hunter | 33/203.18 |
| 4,126,943 | 11/1978 | Senften | 33/203.18 |
| 4,239,389 | 12/1980 | Hollandsworth et al. | 33/288 |
| 4,274,739 | 6/1981 | Grubbs et al. | 33/288 |

*Primary Examiner*—William D. Martin, Jr.

*Attorney, Agent, or Firm*—Beveridge, DeGrandi & Kline

[57] ABSTRACT

A measuring apparatus for the alignment of automobile wheels has six angle pickups of which four are fixed to the wheels lined up with their axes, while two further pickups are fixed to the front wheels by forwardly running support arms. The pickups are more specially electrical units giving electrical ready-for-processing outputs, which pickups are joined together by springs or the like running between one unit and the next one so that two such joined-up pickups have equal and opposite effects on each other.

By processing the signals from the pickups readings are produced for total tracking angle of the front wheels, total tracking angle of the rear wheels, single-wheel tracking angle of the front wheels in relation to the geometrical driving axis, and single-wheel tracking angle of the rear wheels in relation to the axis of symmetry, as well as for the geometrical driving axis, the wheel offset angle of the front wheels with respect to the geometrical driving axis, and the wheel offset angle of the front wheels with respect to the axis of symmetry.

19 Claims, 7 Drawing Figures

AXIS OF SYMMETRY

GEOMETRICAL DRIVING AXIS

WHEEL OFFSET ANGLE WITH RESPECT TO THE GEOMETRICAL DRIVING AXIS

ANGLE BETWEEN GEOMETRICAL DRIVING AXIS AND AXIS OF SYMMETRY

WHEEL ALIGNMENT MEASURING APPARATUS

BACKGROUND OF THE INVENTION

The present invention relates to a wheel alignment measuring apparatus.

In a paper in "Krafthand" no. 18, 1978, with the title "Achsvermessung-grundlegende Neuerung" (a completely new look at measuring wheel alignment), it was said that the development of a new way of measuring wheel alignment has become necessary for overcoming the shortcomings, detailed in the paper, of optical systems used so far in the art, and more importantly, the lining up of the vehicle in an optical four-cornered figure. In the paper, the writer said that for meeting present day needs such wheel alignment apparatus is now to be designed for measuring not only camber, caster, toe-in and toe-out (as is usual practice) but also the single-wheel tracking angles of the front wheels in relation to the geometrical driving axis of the vehicle, the single-wheel tracking angles of the rear wheels with respect to the axis of symmetry of the vehicle, the total tracking angle of the front wheels and the total tracking angle of the rear wheels. The axis of symmetry is defined as an imaginary line, stretching from the center of the front axle to the center of the rear axle. The zero value for the rear wheel single-wheel tracking angle is the position in which the wheel axis is normal to the axis of symmetry. The geometrical driving axis is defined as the line bisecting the rear wheel total tracking angle or, in other words, an imaginary line relative to which the rear wheels have equal inclination. The zero value of the single-wheel tracking angle for the front wheels is the position in which the wheel axis is normal to the geometrical driving axis. On the other hand, the difference in track, that is to say the difference between the tracks of the front and rear wheels, and differences in wheel base, that is to say from the front to the rear axle are not to be taken into account in measuring operations, that is to say they are not to have any effect on the readings produced.

In the prior art, a group of forms of measuring apparatus has been produced with which one or more wheel alignment angles may be measured, see the French Pat. No. 2,343,221, the U.S. Pat. No. 4,126,943, the British Pat. No. 1,372,064, the German Pat. No. 2,935,899, the German Pat. No. 2,926,337, the Swiss Pat. No. 424,288 and the U.S. Pat. No. 3,417,479. These prior forms of measuring apparatus are generally overcomplex and may not be used for measuring the wheel alignment angles needed. In the U.S. Pat. No. 4,126,943 and the French Pat. No. 2,343,221, it is only the front wheels which have two measuring units (projectors) placed on them, the rear wheels only having reflectors for the projectors on the front wheels. For this reason, the angle alignment of the rear wheels is not fully taken into account in the measuring procedure so that also not all of the requirements can be met which are imposed on present-day wheel alignment measuring systems. In the apparatus of the British Pat. No. 1,372,064 and of German Pat. No. 2,926,337, only the alignment of the front wheels is measured, the position and angle of the rear wheels not being taken into account. In the German Pat. No. 2,926,337, as well, the position and angle of the rear wheel is not fully taken into account, although two measuring units, placed on the front wheels, are joined up by way of flexible cables with parts gripping the rear wheels. For this reason, the three last-named apparatus of the prior art may not be said to be in line with the conditions supra, which have to be kept to. Lastly, the Swiss Pat. No. 424,288 and the U.S. Pat. No. 3,417,479 are with respect to apparatus making a rigid frame necessary, if the alignment or angles of all four wheels are to be measured. Such a measuring frame may hardly, because of its size, be moved from place to place and may, in fact, only be used in one given position and not at a number of different positions in a vehicle repair station.

GENERAL OUTLINE OF THE INVENTION

One purpose of the present invention is that of designing a very simple wheel alignment measuring apparatus which is fully in line with modern needs and operates without any external reference system, that is to say may be used at any desired position.

For effecting these and other purposes, the wheel alignment measuring apparatus of the present invention comprises six angle measuring units, of which two angle measuring units are fixed on the front wheels for measuring the total tracking angle of the front wheels, two further angle measuring units are placed on the left hand front wheel and on the left hand rear wheel for measuring the angles of these wheels and two further angle measuring units, placed on the right hand front and rear wheels, are used for measuring the angles of these wheels; means rigidly joining the two first total tracking angle measuring units with said further angle measuring units on said front wheels and an electrical circuit designed for producing a reading for wheel alignment data from the angles measured by said angle measuring units.

The angle measuring units of the apparatus may, for example, be optical or electrical angle measuring units. In the case of a preferred working example of my apparatus, electrical angle measuring units, that is to say angle pickups or deflection indicators, are used, because such pickups are sturdy and simple in structure and, because their output signals are electrical, the input of the signals may take place to the electrical circuit directly. In this respect, the first and the second angle pickups are placed at the ends of support arms, which are fixed to the front wheels at a given angle and, more specially, parallel to the front wheel in question and are designed running out forward past the front wheels. Furthermore, the third and the fourth angle pickups are fixed to the front wheels and the fifth and the sixth pickups are fixed to the rear wheels, lined up on their axes of rotation. By way of elastic tension elements, the first angle pickup is joined with the second angle pickup, the third pickup is joined up with the fifth pickup, placed on the same side of the vehicle and the fourth pickup is joined up with the sixth pickup on the same side of the vehicle so that, because of their positions, such pickups have an opposite and mutual effect on each other.

My apparatus for wheel alignment measuring is based on the fact that knowledge of the relative angles of the separate wheels in relation to each other is all that is necessary for producing readings for the wheel alignment angles. The apparatus of the invention is, for this reason, able to be used at different positions where needed, that is to say no external stationary reference points are needed. Camber, caster and difference in the steering angles are, in any case, not dependent on an external reference point so that these measuring operations may be undertaken as in the prior art, for which reason no account is given of them in connection with the present invention.

Differences in the track and in the wheel base are cut out and do not have any effect on the measuring operation, such cutting out being produced by the right positioning and electrical poling of the angle pickups, as will be made clear infra.

With the measuring apparatus as noted so far, wheel alignment may be measured. For exactly measuring the tracking geometry of a vehicle, it is important to have knowledge of the geometrical driving axis of the vehicle, the wheel offset angles with respect to the same and with respect to the axis of symmetry. So far, the geometrical driving axis has been worked out from the angles of the rear wheels, this reading having to be produced by a number of different measuring operations before hand. For measuring wheel offset an even greater number of measuring operations was necessary, whose data is processed in a complex mathematical calculation. For this reason, further useful developments of the measuring apparatus of the invention have the purpose of sensing, and giving a reading for, the geometrical driving axis, the wheel offset angle with respect to the geometrical driving axis and the wheel offset angle with respect to the axis of symmetry.

For producing a reading for the geometrical driving axis, the wheel alignment measuring apparatus of the invention is furthermore characterized by having a further electrical circuit for giving a reading for the geometrical driving axis, this circuit having an adder which is joined up with the outputs of the angle measuring units on the rear wheels and furthermore between the adder and one of the angle measuring units on the rear wheels an inverter is placed in circuit and the output of the adder is joined up with a divider, decreasing and, more specially, halving the adder's output signal.

The further development of the wheel alignment measuring apparatus of the invention for measuring the wheel offset angle of the front wheels in relation to the geometrical driving axis is characterized in that in addition use is made of an electrical circuit for measuring the wheel offset angle of the front wheels with respect to the geometrical driving axis, this circuit having an adder joined up with the outputs of the six angle measuring units and between the adder and three angle measuring units placed on the same side of the vehicle, an inverter is, in each case, placed before the adder in question, a divider being joined up with the output of the adder for dividing and, more specially, halving the adder's output signal.

The wheel alignment measuring apparatus of the invention as designed for measuring the wheel offset angle of the front wheels with respect to the axis of symmetry, is characterized in that, in addition, there is an electrical circuit for measuring the wheel offset angle of the front wheels with respect to the axis of symmetry, such circuit having an adder, whose output is joined up with the first four angle measuring units which are joined to the front wheels and in that between the adder and two angle measuring units, placed on the same side of the vehicle, one inverter is placed joined with the adder's input, a divider being joined up with the output of the adder for dividing and, more specially, halving the adder's output signal.

The last three forms of my wheel alignment measuring apparatus give, in a simple way, true readings (in degrees and minutes) for the geometrical driving axis and the wheel offset angles with respect to the axis of symmetry and, furthermore, with respect to the geometrical driving axis. Such measuring systems make it possible for the desired readings to be produced in a straightforward way without any complex operations and processes of calculation. One operation of a switch is all that is needed for producing a readout of the necessary values from the electrical circuit. The measuring apparatus of my invention is generally simple and low-price in design, because only one additional, electrical circuit and a switch are necessary, while the display systems of the first form of the invention noted may be made use of.

Furthermore, the operation of the circuits in the three last-named forms of the measuring apparatus of the invention are based on a comparison of the relative angle position of the wheels on one side with the wheels on the other side of the vehicle undergoing wheel alignment examination. The output voltages of the angle pickups, which are fixed at one side of the said vehicle, undergo addition to the output voltages of the angle pickups on the other side, after the last-named have been inverted in an inverter. In a way dependent on the desired reading, the output voltages of two, four or six angle pickups are processed. For getting a reading for the wheel offset in relation to the geometrical driving axis, the output voltages of all six angle pickups are processed. The wheel offset of the front wheels in relation to the axis of symmetry is measured using the output voltages of the four angle pickups, which are joined directly, or by way the support arms, with the front wheels. Furthermore, a reading for the geometrical driving axis may be produced from the output signals of the angle pickups joined up with the rear wheels.

Preferably, the left hand side of a vehicle is taken as a starting base or base-line for measuring operations, because the steering wheel is generally on this side. If, however, the left hand side is to be taken as the baseline, the output voltages from the angle pickups on the right hand side of the vehicle are changed in sign in the inverter system. If then the reading for the geometrical driving axis is positive, the axis will be to the right of the axis of symmetry while if the reading is negative, it will be to the left thereof.

Furthermore developments of my measuring apparatus of good effect are detailed in the dependent claims, the useful effects being given in the account of some working examples of the invention.

LIST OF FIGURES

The account of such working examples will now be presented making use of the drawings of the specification, in which.

DETAILED ACCOUNT OF WORKING EXAMPLE OF MY INVENTION

Firstly, definitions are to be given, using FIGS. 1 to 4, of: "axis of symmetry", "geometrical driving axis", "wheel offset angle" and "angle between geometrical driving axis and axis of symmetry".

Figure 1:
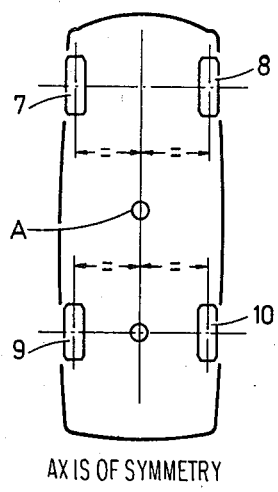
FIGS. 1 to 4 are, in each case, a view looking down onto a vehicle for definition of: "axis of symmetry", "geometrical driving axis", "wheel offset angle" and "angle between geometrical driving axis and axis of symmetry"
Figure 2:
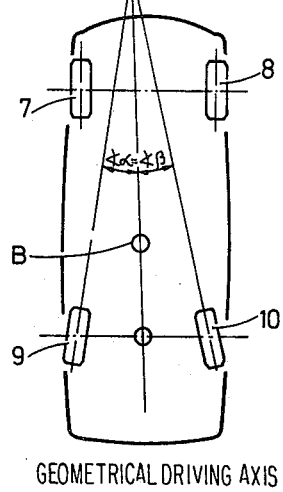
Figure 3:
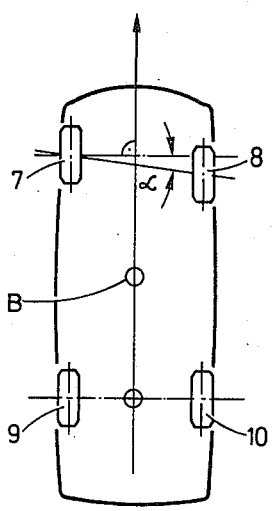
Figure 4:
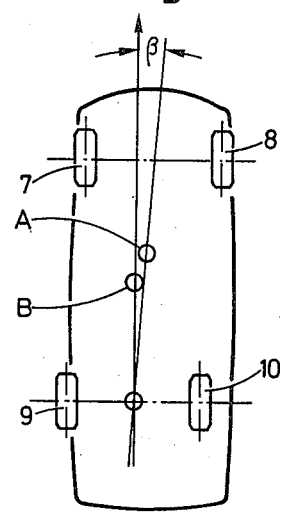

The "axis of symmetry" is taken to be a line A, see FIG. 1, running through the center of the line joining the axle centers of the front wheels 7 and 8 and through the center of the line joining the axle centers of the rear wheels 9 and 10. The geometrical driving axis (FIG. 2) is a line B, bisecting the angle, dependent on the positions of the rear wheels 9 and 10, running forwards, that is to say in the vehicle's direction of motion. The wheel offset angle of the front wheels, with respect to the geometrical driving axis is the angle between the line running between the centers of the front axle, and a line normal to the geometrical driving axis, said angle being marked $\alpha$ in FIG. 3. Lastly, FIG. 4 gives an angle $\beta$, which is the angle between the geometrical driving axis (line B) and the axis of symmetry (line A).

Figure 5:
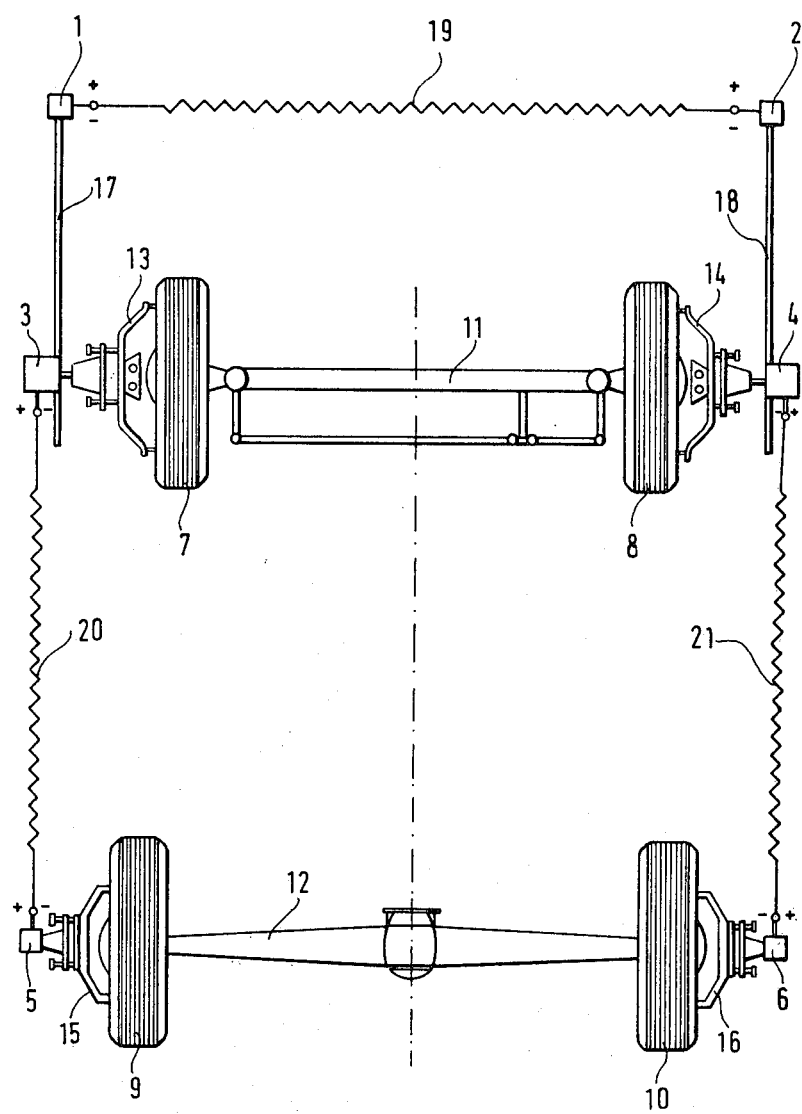
FIG. 5 is a diagrammatic plan-view of the wheels of the front axle and of the rear axle of a motorvehicle with the apparatus of the invention.

In FIG. 5 it will be seen that the angle measuring units take the form of six angle pickups 1 to 6 (or deflection indicators), fixed on the front wheels 7 and 8 and on the rear wheels 9 and 10 of the vehicle. The vehicle will be seen to have front and rear axles 11 and 12, although the apparatus of the invention may be used with vehicles without such solid or single-piece axles. Pickups 3, 4, 5 and 6 are supported by fixing units 13, 14, 15 and, in the other case, 16 on their wheels, details of such fixing units being given in the prior art, see for example U.S. Pat. No. 4,126,943. Fixing units 13 to 16 keep angle pickups 3 to 6 on the axes of turning of the given wheels. Pickups 1 and 2 are fixed to support arms 17 and 18, which, in turn, are supported by fixing units 13 and 14 so as to be parallel to the direction of motion of the front wheel in question and, in fact, are placed in front of the front wheels, that is to say before them in the direction of motion of the vehicle. Such systems have been used in the prior art, see for example German Pat. No. 2,935,899.

Angle pickups 1 and 2 are joined together by elastic tension element 19 so that they have a mutual and opposite effect on each other or, putting it differently, when the front wheels are turned somewhat for steering out of the center position to the left, the pickup 1 will give a negative reading of the change in angle while pickup 2 will give an equal reading of opposite sign (that is to say positive).

Pickups 3 and 5 are joined together by a tension element 20 and are turned towards each other so that they have a direct and opposite effect on each other. In other words, if pickup 5 is moved in position outwardly, it will give a negative change in angle reading, while angle pickup 3 will give an equal but opposite (that is to say positive) reading. The same is true for angle pickups 4 and 6, which are joined together by tension element 21.

Angle pickups or deflection indicators 1 to 6 are, in the present example of the invention, in the form of electromagnetic angle sensing units of known design. By way of their base-plates they are fixed, in each case, to the support arm or the fixing unit, while their pointer legs (or tension legs), whose angle in relation to the base-plate is measured, are joined up in the way noted with the pointer leg, in each case, of the opposite angle pickup. These angle pickups, for this reason, give an output signal of "zero" when the pointer leg is in the on-center position, while a positive or a negative signal will be produced when the pointer leg has been moved out of the center position in one direction or the other. The electrical poling or polarization of angle pickups 1 to 6 is such that on deflecting the pointer leg of one pickup outwardly away from the vehicle, a reading will be given for a difference angle with a positive sign while on deflecting the pointer leg in the opposite direction, a reading will be given for a difference angle with a negative sign. It is naturally possible for all angle pickups to be changed round in polarity as well.

In the working example of the invention, electromagnetic moving iron instruments are used, that is to say one in which the output signal is dependent on the motion of a magnetic core (fixed to the pointer leg) into the field of coils (which are fixed to the base-plate noted). However, use may be made of other sorts of angle pickups, for example pickups based on a rotary potentiometer, for example as offered by Siemens AG in the form of the field plate potentiometer FP 310L100. In this respect, a useful effect is produced insasmuch as the output signals from the pickups, being electrical, may be directly processed.

For undertaking the wheel alignment measuring operations, the angle pickups are fixed to the wheels of the vehicle and the steering system of the vehicle is moved into the straight ahead or on-center position. Then the output signal of the separate angle pickups are processed together for readout of the wheel alignment angles, as will be detailed.

In the following specification, the definitions given below are used. The zero position of a rear wheel in which the single-wheel tracking angle of a rear wheel is zero, is the position in which the wheel axis is normal to the axis of symmetry. The zero position of a front wheel is zero, is the position in which the wheel axis is normal to the geometrical driving axis. A positive single-wheel tracking angle of a single-wheel means that the front of the wheel (as seen in the driving direction of the vehicle) is directed to the inside of the vehicle with respect to the zero position (defined above), whereas a negative single-wheel tracking angle means that the front of the wheel is directed to the outside of the car with respect to the zero position. For example in FIG. 2, both single-wheel tracking angles of the rear wheels 9 and 10 are positive. A positive total tracking angle of the front wheels or the rear wheels means that the sum of the two single-wheel tracking angles of the front wheels or the rear wheels respectively gives a positive angle, whereas a negative total tracking angle of the front wheels or the rear wheels means that the sum of the single-wheel tracking angles gives a negative angle. To give an example for evaluating the total tracking angle of the front wheels, be it assumed that the left hand front wheel (wheel 7 in FIG. 1) may have a negative single-wheel tracking angle of 2° (pointing outwards) and the right hand front wheel (wheel 8 in FIG. 1) may have a positive single-wheel tracking angle of 1°. Then, the total tracking angle of the front wheels would be $-1°$. Finally, a positive wheel offset angle of the front wheels means that the right hand front wheel is in front of the left hand wheel and vice versa. FIG. 3 shows a negative wheel offset angle of the front wheels with respect to the geometrical driving axis. This is true because the left hand side of the vehicle is taken as the base line of these measurements.

Figure 6:
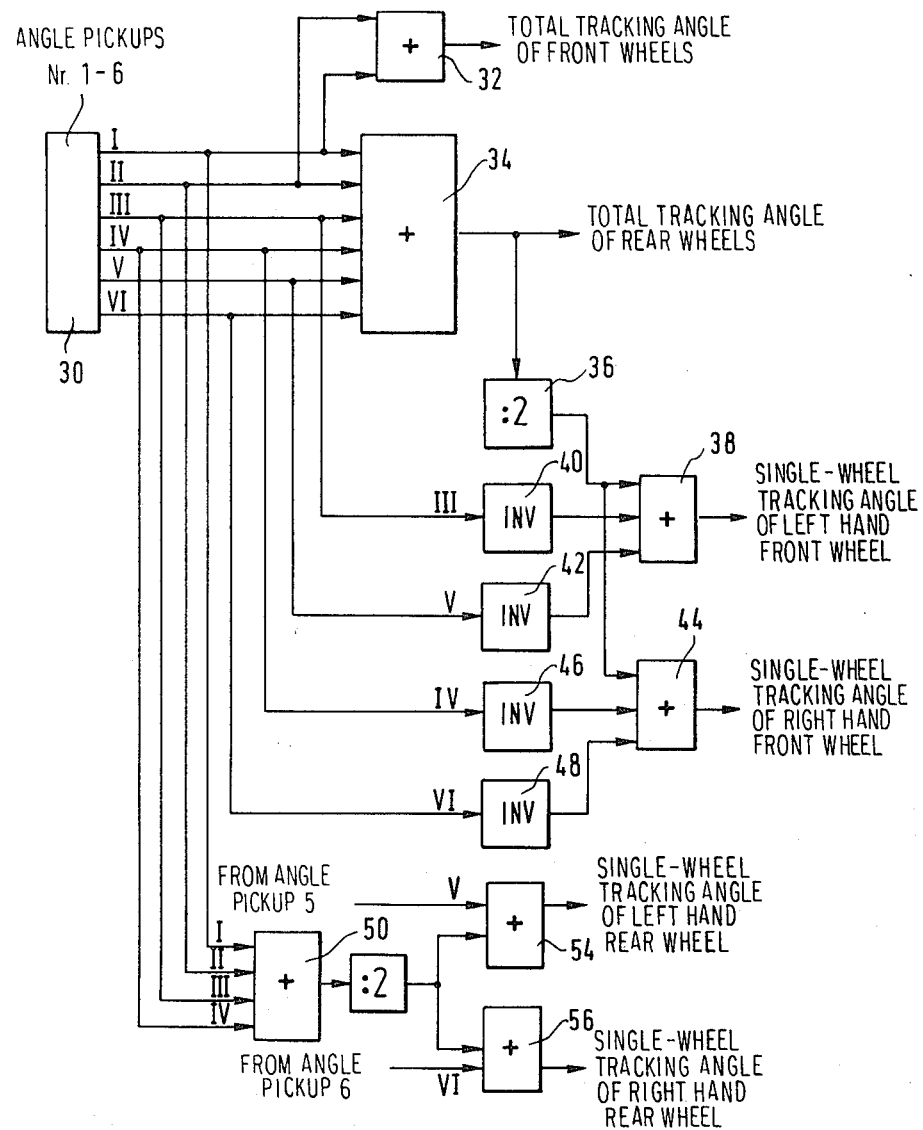
FIG. 6 is a block schematic of the circuit for producing readings for the wheel alignments.

In FIG. 6 the angle pickups 1 to 6 as well as their amplifiers for their output signals (which amplifiers are of common construction well known to the man skilled in the art) are marked diagrammatically as block 30, the outputs I to VI marking the amplified output signals of pickups 1 to 6. Output signals I and II of angle pickups 1 and 2 go to an adder circuit 32 for addition, the adder's output signal being representative of the total tracking angle of the front wheels. In the system given of angle pickups 1 and 2, offset of the front wheels in the direction of motion within the limits as given by the vehicle maker (up to 50 mm) is automatically cut out in producing the reading for the total tracking angle of the front wheels, because wheel offset is responsible for equal but opposite changes in angle at angle pickups 1 and 2 so that these values, being equal and opposite, will be cut out on addition of the output signals of said pickups 1 and 2.

For producing a reading for the total tracking angle of the rear wheels, a further addition circuit 34 is used for summation of the output signals of all pickups 1 to 6, the output signal of addition circuit 34 then being representative of the total tracking angle of the rear wheels. This outcome is produced by the placing of the angle pickups and the way in which they are poled, as is shown in FIG. 5.

For example, in the case of positive toe-in, pickups 1 and 2 will give positive output signals. By the same positive toe-in there will be given equal angular changes of a negative sign in the output signals of the pickups 3 and 4 so that by summation of the output signals of pickups 1 to 4, the effect of toe-in will be cut out. Furthermore, the output signals of pickups 3 and 4 will be influenced by track difference, that, however, will have an equal and opposite effect on angle pickups 5 and 6 so that the effect of track difference will be cut out. The summation of the output signals of angle pickups 1 to 6 will, for this reason, give a reading for the total tracking angle of the rear wheels. On the same lines, the effect of differences in wheel base, that is to say differences in the spacing between the front and rear axles will be cut out. In the case of differences in wheel base it is only the absolute values of the changes in angle thereby produced which will be changed so that, as was the case with track difference, the changes in angle will be equal and opposite and of no effect.

For producing a reading for the single-wheel tracking angle of the left hand front wheel with respect to the geometrical driving axis, the circuit of FIG. 6 is designed as follows. The output of addition circuit 34 is joined up with a division circuit 36, by which the signal, representative of the total tracking angle of the rear wheels is halved and which feeds the output signal to a further addition circuit 38. The addition circuit 38 has two further inputs, the one input getting the inverted output signal, inverted by the inverter 40, of the third pickup and the other input gets the output signal, inverted by inverter 42, of angle pickup 5. The outcome of addition in addition circuit 38 will be a signal representative of the single-wheel tracking angle of the left hand front wheel. The reading for the single-wheel tracking angle of the right hand front wheel is produced on the same lines. For this purpose, a further addition circuit 44 is provided, whose inputs are joined up as follows. The first input is joined up with the output of division circuit 36. The second input is joined up with an inverter 46, whose input gets the output signal of angle pickup 4, while the last input is joined up with an inverter 48, whose input gets the output signal of angle pickup 6. For this reason, at the inputs of addition circuit 44 there will be values for half of the total tracking angle of the rear wheels and the inverted values of the pickups 4 and 6. The output signal of addition circuit 44 is representative of the single-wheel tracking angle of the right hand front wheel.

For producing a reading for the single-wheel tracking angle of the left hand and of the right hand front wheel, respectively, in relation to the geometrical driving axis, the relative portion of the wheels of one side of the vehicle to each other and the total tracking angle of the rear wheels is taken into account. The relative position of the wheels of one side of the vehicle to each other is given for the left hand side by the output signals of angle pickups 3 and 5, and for the right hand side by the output signals of pickups 4 and 6. The track difference is cut out, as noted supra, by the special placing of the angle pickups. If, for example, the left hand front wheel has a positive angle, the output signal of pickup 3 will be negative, while that of pickup 5 will be positive when the left hand rear wheel 9 has positive angle. On summating the two output signals of pickups 3 and 5, and inverting the outcome (multiplication with $-1$) the outcome will be the tracking angle difference between the front and rear wheel, a positive reading indicating that the front wheel has a greater positive tracking angle than the rear wheel. On adding, to this tracking angle difference, half of the total tracking angle of the rear wheels will result in the single-wheel tracking angle of the front wheel in question with respect to the geometrical driving axis is defined as the line bisecting the total tracking angle of the rear wheels.

The circuit for producing a reading for the single-wheel tracking angle of the left hand rear wheel in relation to the vehicle's axis of symmetry has an addition circuit 50 for summation of the output values of angle pickups 1 to 4, circuit 50 having its output joined up with a division circuit 52 for halving the outcome of addition made in addition circuit 50. Output of division circuit 52 is joined with a further addition circuit 54, whose second input is joined up with angle pickup 5. The output of addition circuit 54 is representative of the single-wheel tracking angle of the left hand rear wheel 9. The circuit for giving a reading for the single-wheel tracking angle of the right hand rear wheel with respect to the axis of symmetry of the vehicle has a further addition circuit 56, whose one input is joined up with the output of the division circuit 52 and whose other input is joined up with angle pickup 6, while its output will be at a level representative of the single-wheel tracking angle of the right hand rear wheel 10.

As noted earlier, the sum of the outputs of angle pickups 1 and 2 will be the total tracking angle of the front wheels. At angle pickups 3 and 4, the tracking angles of the front wheels will be effective with an equal amount but with an opposite sign as is the case at angle pickups 1 and 2. The output signals of angle pickups 3 and 4 will furthermore be dependent on values representative of the offset of the wheels caused by differences in track. Because on the addition of the output signals of angle pickups 1 to 4, the components representative of the tracking angles of the front wheels will be equal and opposite so that they are cut out, on addition the only outcome will be the size of the offset angle caused by track difference. The value of the offset angle is, by division by 2, attributed to each side in half of its amount so that the relation with respect to the axis of symmetry is established. Since the offset angle value, because of the track difference, will go into the output signals of angle pickups 5 and 6 to the same amount as is the case with angle pickups 3 and 4, but with an opposite sign, on addition of the output value of the angle pickup 5 to the output of division circuit 52 the single-wheel tracking angle for the left hand rear wheel 9 will be given, while on addition of the output signal of angle pickup 6 to the output signal of division circuit 52, the single-wheel tracking angle of the right hand rear wheel 10 will be given.

From the account so far, it will be seen that the apparatus gives readings for: total tracking angle of the front wheels, total tracking angle of the rear wheels, single-wheel tracking angles of the two front wheels with respect to the geometrical driving axis and single-wheel tracking angles of rear wheels with respect to the axis of symmetry. The other readings in connection with the wheels, that is to say camber, caster, steering wheel difference angle and rim wobble can be produced in ways known in the prior art so that no account is necessary.

Figure 7:
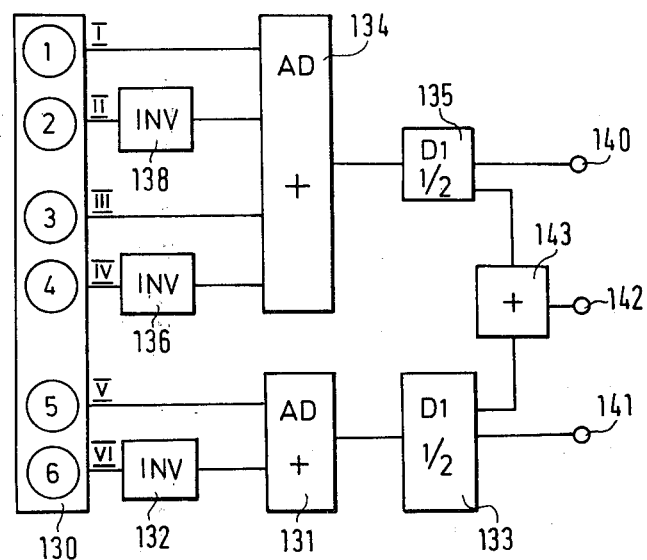
FIG. 7 is a block schematic of the electrical circuit for producing readings for desired wheel alignment conditions.

In FIG. 7 the angle pickups 1 to 6 and their amplifiers for their output signals are presented diagrammatically as block 130, nos. I to VI being used as representative of the amplified output signals of angle pickups 1 to 6. The output signals I and II of angle pickups 1 and 3 go directly to an adder 134 which furthermore gets the output signals II and IV of angle pickups 2 and 4 by way of inverter 138 and, in the other case, 136. In adder 134 the signals are added, its output signal going to a divider 135 for halving the signal. In this way readings for the wheel offset angle with respect to the axis of symmetry will be given at output 140. Furthermore, an adder 131 is joined up with the angle pickup 5 for addition of output signal V of this angle pickup 5 to the output signal VI (inverted by inverter 132) of angle pickup 6. The output signal of adder 131 goes to a divider 133 by which this output signal is halved. In this way a reading is produced for the geometrical driving axis of the vehicle at an output terminal 141. By putting together the output signals of the divider 135 and the divider 133 in a summating unit 143 it is lastly possible to get the reading, at an output terminal 142, for the wheel offset angle in relation to the geometrical driving axis.

The wheel alignment or misalignment values produced in the apparatus may be displayed in an analog or digital form at the same time or one after the other in a readout or display unit. The invention is not limited to the use of electrical angle pickups of the sort noted. In the case of a form of the apparatus of the invention with optical angle pickups it is possible to make use of projectors as widely used in the art, which may, for this purpose, be turningly fixed to base-plates, the electrical signals necessary for processing in the circuit being produced on changing the deflection of the projectors on the base-plates, while lining up the projectors being on the zero point of the opposite projector.

I claim:

1. A wheel alignment measuring apparatus designed for measuring wheel alignment angles of a vehicle having front and rear wheels and comprising:

six angle measuring units, first and second said angle measuring units adapted for connection respectively to the left and right front wheels of the vehicle and including angle pickup means for measuring and producing signals indicating the total tracking angles of both front wheels, third and fifth said angle measuring units adapted for connection respectively to the left front wheel and a left rear wheel and including angle pickup means for measuring and producing signals indicating the angles of these wheels, and fourth and sixth said angle measuring units adapted for connection respectively to the right front wheel and a right rear wheel and including angle pickup means for measuring and producing signals indicating the angles of these wheels, means rigidly joining the first said angle measuring unit with said third angle measuring unit means rigidly joining said second angle measuring unit with said fourth angle measuring unit, and an electrical circuit means for receiving signals from said angle pickup means and for producing a reading for wheel alignment data from the angles measured by said angle measuring units.

2. The structure as claimed in claim 1 wherein said angle measuring units have relative placements and polarities arranged to cut out effects produced by track differences and wheel base differences so that output readings are produced free of such differences.

3. The structure as claimed in claim 1 or claim 2, further comprising support arms fixed to said front wheels at given angles, said first and second angle pickups being fixed to said support arms forwardly of said front wheels, said angle pickup means of the third and fourth angle measuring units being fixed to the front wheels in alignment with the rotational axes thereof, an elastic tension element joining said first angle pickup means to the second angle pickup means so that said pickups have an opposite and mutual effect on each other, an elastic tension element joining the third angle pickup means to the fifth angle pickup means so that said pickup means have an opposite and mutual effect on each other, and an elastic tension element joining the fourth angle pickup means with the sixth angle pickup means so that said pickups have an opposite and mutual effect on each other.

4. The structure as claimed in claim 3, wherein the angle pickups associated with each of the elastic tension elements are turned facing towards each other and wherein each angle pickup is so electrically poled that, in the case of all angle pickups on outward motion of the pickup away from the vehicle, difference angles with the same positive or negative sign will be produced as a reading and, in the case of opposite motion out of position, difference angles with opposite sign will be given as a reading.

5. The structure as claimed in claim 1 wherein said electrical circuit means includes, for giving a reading for the total tracking angle of the front wheels, an addition circuit joined with outputs of said first and second angle pickups.

6. The structure as claimed in claim 1 wherein said electrical circuit means includes, for giving a reading for the total tracking angle of the rear wheels, an addition circuit joined up with outputs of the six angle pickups.

7. The structure as claimed in claim 1 wherein said electrical circuit means includes the following for giving a reading for a single-wheel tracking angle of the left hand and of the right hand front wheel with respect to the geometrical wheel dependent tracking axis: an addition circuit joined up with outputs of the six angle pickups, a division circuit joined up with the output of said addition circuit, and in which the outcome of addition is halved, and a further addition circuit, which is joined up with the output of said division circuit and at two further inputs is joined up by way of inverters with the angle pickups on the left hand and right hand vehicle side.

8. The structure as claimed in claim 1 wherein said electrical circuit means includes the following for giving a reading for the single-wheel tracking angle of the left hand and of the right hand rear wheel with respect to the axis of symmetry of the vehicle: a first addition circuit joined up with the output of the first four angle pickups, a division circuit joined with said addition circuit, and in which the outcome of addition is halved, and a further addition circuit, which is joined up at a first input with the output of the division circuit and at a second input with the angle pickup on the left hand and right hand rear wheel.

9. The structure as claimed in claim 1 wherein the electrical circuit means includes the following for giving a reading for the geometrical driving axis: an adder joined with outputs of the angle measuring units on the rear wheels, an inverter located between one of the angle measuring units on the rear wheels and the adder, a divider connected to the output of the adder for halving the output signal of said adder.

10. The structure as claimed in claim 1 wherein the electrical circuit includes the following for giving a reading for the wheel offset angle of the front wheels with respect to the geometrical driving axis: an adder joined up with the outputs of the six angle measuring units, inverter means located between the adder and three angle measuring units placed on the same side of the vehicle a divider being joined up with the output of the adder for halving the output signal of said adder.

11. The structure as claimed in claim 1 wherein the electrical circuit includes the following for giving a reading for wheel offset angle of the front wheels with respect to the axis of symmetry: an adder whose input is joined up with the first four angle measuring units which are joined to the front wheels, inverters positioned between the adder and two angle measuring units on the same side of the vehicle, said inverters being joined with the inputs of the adders, and a divider joined up with the output of the adder for halving the adder's output signal.

12. The wheel alignment measuring apparatus as claimed in claim 11, wherein said inverters are joined up with the outputs of angle pickups on the right hand side of said vehicle.

13. A wheel alignment measuring apparatus designed for measuring wheel alignment angles of a vehicle having front and rear wheels, comprising,
first and third angle measuring means for sensing the tracking angle of the front left wheel and for providing signals corresponding thereto,
second and fourth angle measuring means for sensing the tracking angle of the front right wheel and for providing signals corresponding thereto,
fifth angle measuring means for sensing the tracking angle of the left rear wheel and for providing signals corresponding thereto,
sixth angle measuring means for sensing the tracking angle of the right rear wheel and for providing signals corresponding thereto,
means interconnecting the first and second angle measuring units so that the angles sensed thereby have an opposite and mutual effect on each other,
means interconnecting the third and fifth angle pickups so that the angles sensed thereby have an opposite and mutual effect on each other,
means interconnecting the fourth and sixth angle pickups so that the angles sensed thereby have an opposite and mutual effect on each other, and,
electrical circuit means for receiving signals from said angle measuring means and for producing output signals which indicate wheel alignment data.

14. The apparatus of claim 13 wherein said electrical circuit includes means for providing an output signal which is the sum of the following:
one half of the sum of the signals from the first, second, third, fourth, fifth and sixth angle measuring units, and
the signals from the third and fifth angle measuring units, inverted to reverse their polarity,
said output signal indicating the tracking angle of the left front wheel with respect to the geometrical driving axis of the vehicle.

15. The apparatus of claim 13 wherein said electrical circuit includes means for providing an output signal which is the sum of the following:
one half of the sum of the signals from the first, second, third, fourth, fifth and sixth angle measuring units, and
the signals from the fourth and sixth angle measuring units, inverted to reverse their polarity,
said output signal indicating the tracking angle of the right front wheel with respect to the geometrical driving axis of the vehicle.

16. The apparatus of claim 13 wherein said electrical circuit includes the following components for giving a tracking angle of the rear wheel on one side of the vehicle with respect to the axis of symmetry of the vehicle:
means for producing a preliminary signal which is one half the sum of the signals from the first, second, third and fourth angle pickups, and means for adding the preliminary signal a signal from the angle pickup on the rear wheel on said one side of the vehicle.

17. The apparatus of claim 13 wherein said electrical circuit includes means for providing an output signal which is one half the sum of the following:
a signal from the angle measuring unit on one rear wheel, and
a signal from the angle measuring unit on the other rear wheel which has been inverted to reverse its polarity,
said output signal indicating the geometrical driving axis of the vehicle.

18. The apparatus of claim 13 wherein said electrical circuit means includes means providing an output signal which is one-half the sum of the following:
the output signals, inverted to reverse their polarity, of the three angle measuring units on said one side of the vehicle, and
the output signals of the three angle measuring units on the opposite side of the vehicle,
said output signal giving a reading of the wheel offset angle of a front wheel on one side of the vehicle, measured relative to the geometrical driving axis.

19. The apparatus of claim 13 wherein said electrical circuit includes means for providing an output signal which is one half of the following:

the output signals from the two angle measuring units on one front wheel on one side of the vehicle, inverted to reverse their polarity, and the output signals from the two angle measuring units on the front wheel on the other side of the vehicle;

said output signal indicating the wheel offset angle of the front wheel on said one side of the vehicle, relative to the axis of symmetry of the vehicle.

* * * * *

Notice off Adverse Decision in Interference

In Interference No. 101,047, involving Patent No. 4,341,021, O. Beissbarth, WHEEL ALIGNMENT MEASURING APPARATUS, final judgment adverse to the patentee was rendered June 26, 1989, as to claims 1 and 2.

[*Official Gazette September 19, 1989.*]